(12) United States Patent
Ni et al.

(10) Patent No.: US 11,693,434 B2
(45) Date of Patent: Jul. 4, 2023

(54) WATER QUALITY MONITORING SYSTEM AND METHOD THEREOF

(71) Applicant: Delta Electronics, Inc., Taoyuan (TW)

(72) Inventors: Wang-Shen Ni, Taoyuan (TW); Wen-Yu Chuang, Taoyuan (TW); Hao-Chieh Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 1085 days.

(21) Appl. No.: 16/403,047

(22) Filed: May 3, 2019

(65) Prior Publication Data
US 2019/0339723 A1 Nov. 7, 2019

(30) Foreign Application Priority Data
May 4, 2018 (CN) .......................... 201810419104.4

(51) Int. Cl.
*G05D 7/06* (2006.01)
*G05D 23/19* (2006.01)
*G08B 21/18* (2006.01)

(52) U.S. Cl.
CPC .......... *G05D 7/0635* (2013.01); *G05D 23/19* (2013.01); *G08B 21/18* (2013.01);
(Continued)

(58) Field of Classification Search
None
See application file for complete search history.

(56) References Cited

U.S. PATENT DOCUMENTS

2005/0139530 A1* 6/2005 Heiss ................. C02F 9/00
210/257.2

FOREIGN PATENT DOCUMENTS

CN 106325144 A 1/2017
CN 206906833 U 1/2018
(Continued)

OTHER PUBLICATIONS

Office Action dated Sep. 26, 2018 in TW Application No. 107115254, 7 pages.
(Continued)

*Primary Examiner* — Richard C Gurtowski
(74) *Attorney, Agent, or Firm* — Muncy, Geissler, Olds & Lowe, P.C.

(57) ABSTRACT

A water quality monitoring system is provided, including several sensors, several actuators, and an embedded system. The sensors sense environmental parameters and separately output a plurality of sensing signals including the environmental parameters. The actuators change the environmental parameters. The embedded system includes a storage module, a data collection module, a data analysis module, and a control module. The storage module stores a plurality of normal parameter ranges that correspond to the respective environmental parameters. The data collection module is connected to the sensors for receiving the sensing signals. The data analysis module is connected to the storage module and the data collection module to determine whether the sensing signals are abnormal according to the normal parameter ranges and output a determination result. The control module is connected to the data analysis module to control the actuators or output a warning signal according to the determination result.

11 Claims, 2 Drawing Sheets

(52) U.S. Cl.
CPC .... *C02F 2209/006* (2013.01); *C02F 2209/02* (2013.01); *C02F 2209/04* (2013.01); *C02F 2209/05* (2013.01); *C02F 2209/06* (2013.01)

(56) References Cited

FOREIGN PATENT DOCUMENTS

| TW | 201114365 A | 5/2011 |
| TW | M-555355 U | 2/2018 |

OTHER PUBLICATIONS

Office Action dated Mar. 25, 2021 in CN Application No. 201810419104.4, 10 pages.
Office Action dated Jul. 8, 2021 in CN Application No. 201810419104.4, 11 pages.
Bin et al., "Design of aquaculture water quality monitoring and controlling system based on Internet of things," Transducer and Microsystem Technologies, Nov. 30, 2016, 4 pages.

* cited by examiner

WATER QUALITY MONITORING SYSTEM AND METHOD THEREOF

CROSS REFERENCE TO RELATED APPLICATIONS

The present application is based on, and claims priority from, China Application Serial Number 201810419104.4, filed on May 4, 2018, the disclosure of which is hereby incorporated by reference herein in its entirety.

BACKGROUND

Field of the Invention

The present invention relates to a water quality monitoring system and a method thereof, especially relates to a water quality monitoring system and the method thereof for determining whether the sensors are abnormal.

Description of the Related Art

In existing water quality monitoring systems, when the system receives data output by the sensors, the system usually adopts the numerical value of the sensors, and the analysis module merely issues warnings according to the standard of the upper and lower limits of the numerical value to remind the user that the water quality environment is abnormal. However, when the sensors are failed or need to be calibrated, this may cause the measured numerical value to be outside of reasonable range. If the user does not deal with or calibrate the sensors in time, incorrect data may cause the system to make erroneous adjustments. Therefore, how to avoid performing environmental control based on the incorrect value of one or more sensors is a problem that must be solved.

BRIEF SUMMARY

An embodiment of the present invention provides a water quality monitoring system, such as a water quality monitoring system applied to aquaculture monitoring. The water quality monitoring system includes a plurality of sensors, a plurality of actuators, and an embedded system. The sensors are used to sense a plurality of environmental parameters and output a plurality of sensing signals that correspond to the environmental parameters. The actuators are used to change the environmental parameters. The embedded system includes a storage module, a data collection module, a data analysis module, and a control module. The storage module is used to store a plurality of normal parameter ranges that correspond to the respective environmental parameters. The data collection module connected to the sensors is used to receive the sensing signals. The data analysis module is connected to the storage module and the data collection module. The data analysis module is used to determine whether the plurality of sensing signals are normal according to the plurality of normal parameter ranges and output a determination result. The control module is connected to the data analysis module and is used to control the plurality of actuators or output a warning signal according to the determination result.

Another embodiment of the present invention further provides a method of water quality monitoring, including: sensing a plurality of environmental parameters through a plurality of sensors, and separately outputting a plurality of sensing signals that correspond to the environmental parameters; receiving the sensing signals through a data collection module of an embedded system; determining whether the sensing signals are abnormal according to the sensing signals and a plurality of normal parameter ranges that correspond to the respective environmental parameters through a data analysis module of the embedded system, and outputting a determination result; and controlling at least one of a plurality of actuators or outputting a warning signal according to the determination result through a control module of the embedded system. The normal parameter ranges are stored in a storage module of the embedded system.

DETAILED DESCRIPTION

The water quality monitoring system and method thereof of the present invention and other ranges to which the system is applicable will be apparent from the detailed description provided hereinafter. It should be understood that the following detailed description and specific embodiments, when the exemplary embodiments related to the water quality monitoring system and method thereof are set forth, are presented solely for illustrative purposes and not intended to limit the scope of the present invention.

Figure 1:
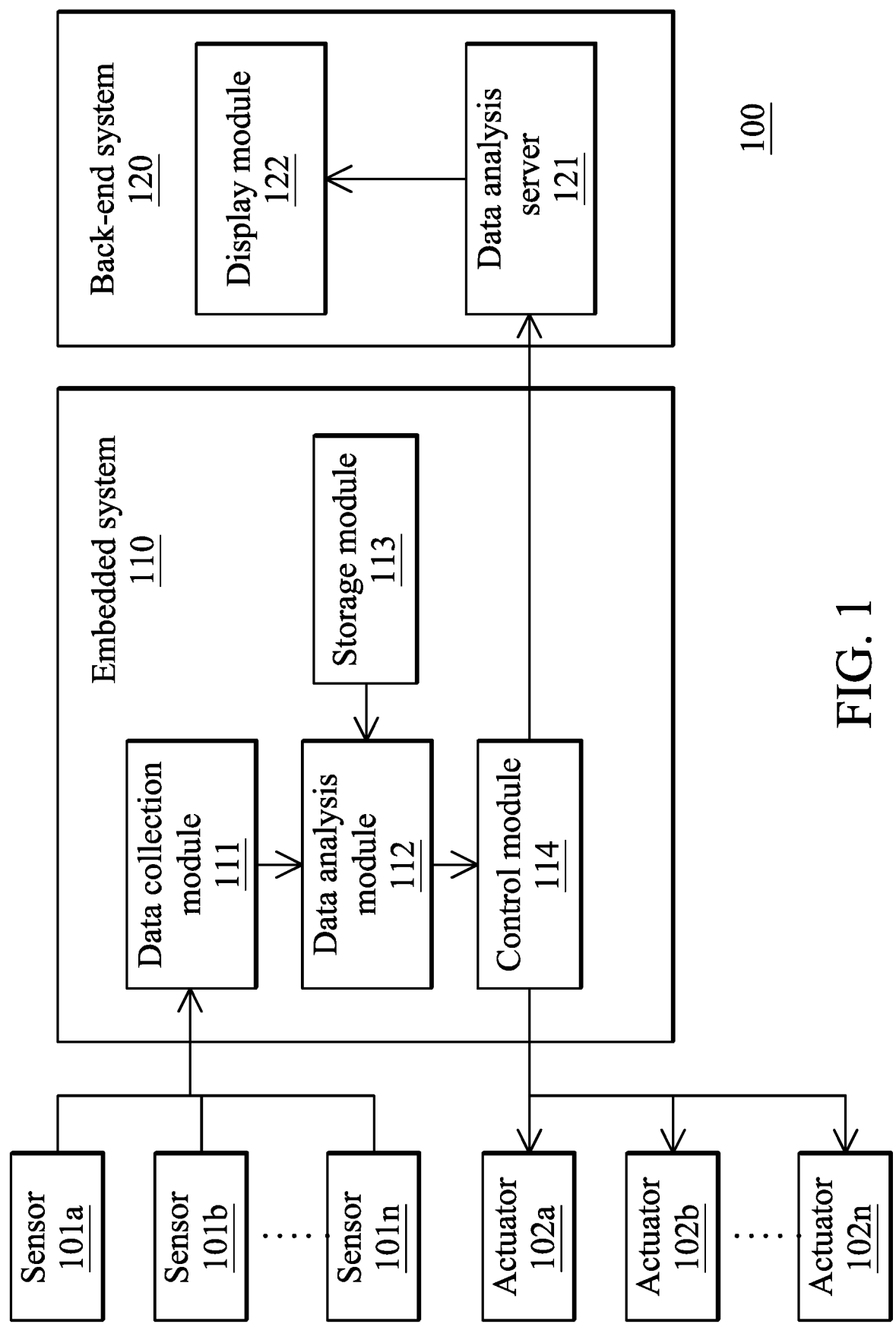
FIG. 1 illustrates a system architecture diagram of the water quality monitoring system according to an embodiment of the present invention.

FIG. 1 is a system architecture diagram showing a water quality monitoring system according to an embodiment of the present invention. The water quality monitoring system 100 includes a plurality of sensors 101a-101n, a plurality of actuators 102a-102n, an embedded system 110, and a back-end system 120. The sensors 101a-101n may include any sensors which can acquire environmental parameters related to water quality monitoring or aquaculture. The environmental parameters may include, for example, temperature, pH value, oxidation-reduction potential, salinity, and the like. The actuators 102a-102n may include various devices that can change the environmental parameters described above, such as a water wheel, a heating rod, and a water change valve. It should be noted that the foregoing examples of the environmental parameters and the actuators are only used as examples of the present invention, and are not limited thereto.

The embedded system may include a data collection module 111, a data analysis module 112, a storage module 113, and a control module 114. The data collection module 111 is connected to sensors 101a-101n and is configured to receive a plurality of sensing signals that correspond to the foregoing environmental parameters, wherein the plurality of sensing signals are output by the sensing sensors 101a-101n. The data analysis module 112 is connected to the data collection module 111, and is configured to determine whether the sensing signals are abnormal according to the sensing signals and a plurality of normal parameter ranges stored in the storage module 113. Each one of the plurality of environmental parameters has a corresponding normal parameter range. The normal parameter ranges can be obtained through experimental methods or analysis of actual data, and are stored in the storage module 113 in advance. The control module 114 is configured to decide to activate/deactivate one of the actuators 102a-102n or output a warning signal corresponding to the abnormality of the sensors 101a-101n according to the determination result of the data analysis module 112. The data collection module 111, the data analysis module 112, and the control module 114 can be respectively implemented by a plurality of microcontrollers or can be integrated into a single processor when the microcontrollers and the single processor load and execute codes or software. When the data collection module 111, the data analysis module 112, and the control module 114 are respectively implemented by a plurality of microcontrollers, the data collection module 111 receives the plurality of sensing signals from the sensors 101a-101n, the data analysis module 112 determines whether the sensing signals received by the data collection module 111 are abnormal, and the control module 114 decides to activate/deactivate one of the actuators 102a-102n or output a warning signal corresponding to the abnormality of the sensors 101a-101n according to the determination result of the data analysis module 112. When the data collection module 111, the data analysis module 112, and the control module 114 are integrated into a single processor, the single processor may implement a process that receives the plurality of sensing signals from the sensors 101a-101n, determines whether the received sensing signals are abnormal, and decides to activate/deactivate one of the actuators 102a-102n or output a warning signal corresponding to the abnormality of the sensors 101a-101n according to the determination result. Wherein the storage module 113 may be a non-volatile storage device such as hard disk drive, USB flash drive, and the like.

The back-end system 120 may be implemented in an electronic device such as a desktop computer, a laptop computer, or a tablet computer, and the like, and the back-end system 120 at least includes a data analysis server 121 and a display module 122. The data analysis server 121 may be implemented in various ways such as a dedicated hardware circuit or general hardware (e.g. a single processor, multiple processors with parallel processing function, a graphics processor, or other processors with operation capability). The data analysis server 121 provides the functions described afterwards when executing the codes or the software. The back-end system 120 may further include another storage module (not shown), the other storage module is connected to the data analysis server 121 and control module 112, and is configured to store the determination result output by the data analysis module 112 and the environmental parameters that correspond to the determination result. The display module 122 can be a display panel (e.g., a thin film liquid-crystal display panel, an organic light emitting diode panel or other panel with display function, etc.) for displaying at least the determination result, the warning signal, the environmental parameters, and the environmental health level obtained after the analysis, for the user to view. In addition, the back-end system 120 may further include a communication interface (not shown), the communication interface may be a local area network (LAN) communication module, a wireless local area network (WLAN) communication module, a Bluetooth communication module, and the like. The communication interface is configured to communicate with the embedded system 110 to obtain various environmental parameters and signals.

According to one embodiment of the present invention, when the data collection module 111 receives the sensing signals that correspond to the respective environmental parameters from the sensors 101a-110n at predetermined intervals, the data collection module 111 transmits the sensing signals to the data analysis module 112 to perform the determination. Next, the data analysis module 112 accesses the plurality of normal parameter ranges that have been stored in advance from the storage module 113 to determine whether the received environmental parameters are abnormal. When the data analysis module 112 determines that the environmental parameters are within the normal parameter ranges, a normal signal is output to the control module 114, causing the control module 114 to control or adjust the corresponding actuators 102a-102n according to the normal signal and the value and type of the environmental parameters. For example, according to an example of the present invention, when the control module 114 receives the sensing signal corresponding to the temperature and the normal signal representing that the sensing signal is normal, the control module 114 accesses a temperature threshold value that has been stored in advance from the storage module 113 and determines whether the temperature has to be adjusted according to the temperature threshold value. When the temperature is too low, the control module 114 outputs a control signal to activate the heating rod to increase temperature of the environment, and when the temperature reaches the temperature threshold value, the heating rod is deactivated.

According to another example of the present invention, when the control module 114 receives the sensing signal corresponding to the pH value and the normal signal, the control module 114 accesses a pH threshold value that has been stored in advance from the storage module 113 to determine whether the pH value has to be adjusted according to the pH threshold value. When the pH value is too high or too low, the control module 114 may adjust the pH value by changing the water by activating the water change valve.

According to another example of the present invention, when the control module 114 receives the sensing signal corresponding to the salinity and the normal signal, the control module 114 accesses a salinity threshold value that has been stored in advance from the storage module 113 to determine whether the salinity has to be adjusted according to the salinity threshold value. Similarly, when the salinity is too high or too low, the control module 114 may adjust the salinity by changing the water by activating the water change valve.

According to another example of the present invention, when the control module 114 receives the sensing signal corresponding to the oxidation-reduction potential and the normal signal, the control module 114 accesses a oxidation-reduction potential threshold value that has been stored in advance from the storage module 113 to determine whether the oxidation-reduction potential has to be adjusted according to the oxidation-reduction potential threshold value. When the abnormality of the oxidation-reduction potential (i.e. the difference between the oxidation-reduction potential and the oxidation-reduction potential threshold value is too large) is caused by the oxygen content being too low, the control module 114 activates the water wheel to pump water to increase the oxygen content in the water. Alternatively, when the difference between the oxidation-reduction potential and the oxidation-reduction potential threshold value is caused by a change in the ion content, the control module 114 may change the water by activating the water change valve.

After the foregoing environmental parameters that correspond to the normal signals have been determined by the control module 114, the control module 114 transmits the foregoing environmental parameters to the storage unit of the back-end system 120 for storage. The environmental parameters are provided to the data analysis server 121 for further analysis to determine an appropriate environmental health level for the water quality monitoring environment.

However, when the data analysis module 112 determines that the environmental parameters received by the data collection module 111 are abnormal according to the normal parameter ranges stored in the storage module 113, the data analysis module 112 transmits an abnormal signal to the control module 114. When the control module 114 receives the abnormal signal, this means that the sensor corresponding to the environmental parameter is abnormal, the control module 114 will not determine the environmental parameter corresponding to the sensing signal, and will not control any one of the actuators 102a-102n. The control module will only output a reminder signal to the data analysis server 121, such that the data analysis server 121 can display a reminder signal through the display module 122 or using other methods to notify the user. Therefore, the user can calibrate or change the sensor corresponding to the environmental parameter. The control module 114 may further store the environmental parameters that correspond to the abnormal signals in the storage module of the back-end system 120 for analysis by the data analysis server 121 as a reference for the service life and the calibration of the sensors.

Figure 2:
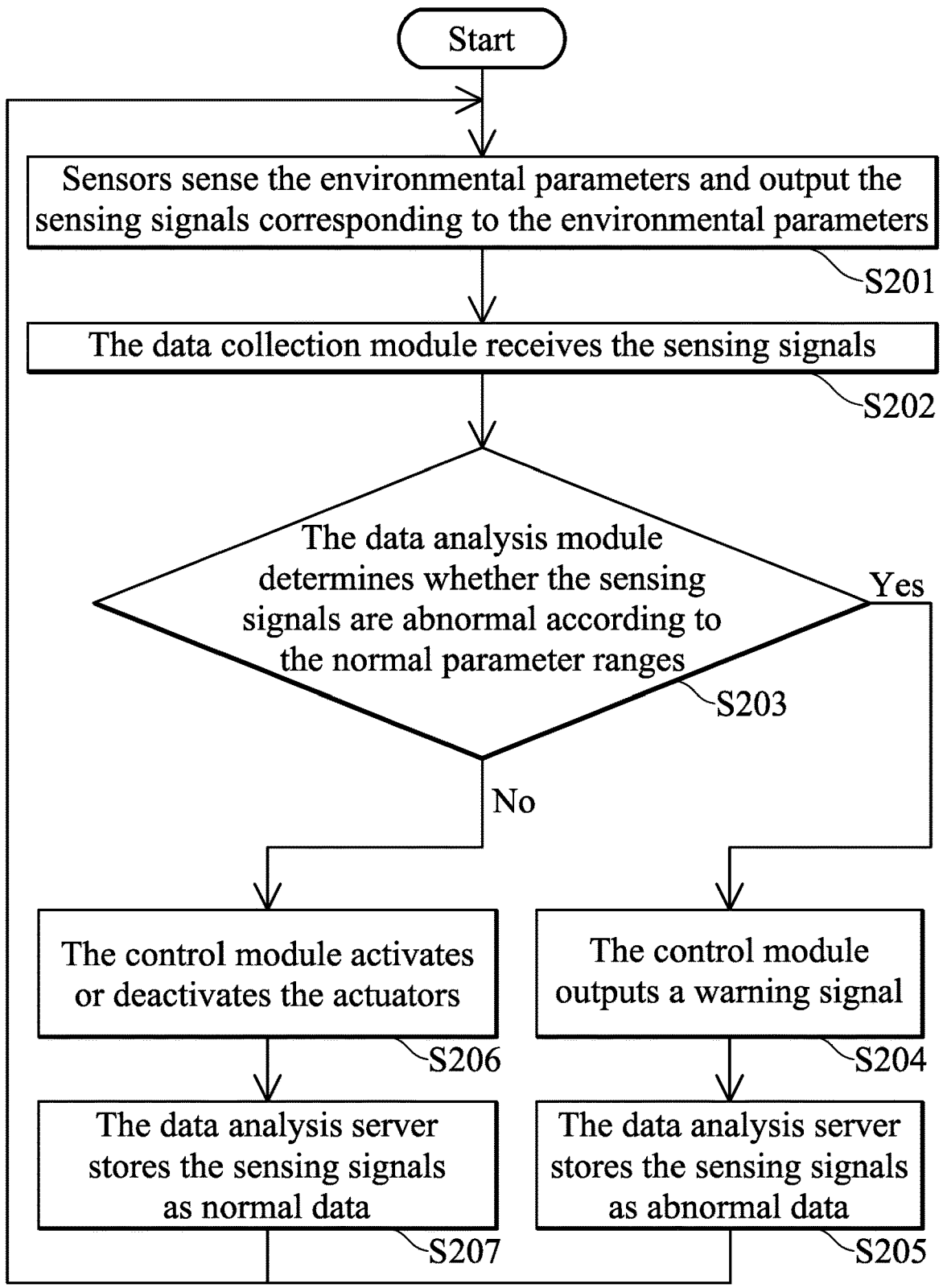
FIG. 2 shows a flow chart of the method of water quality monitoring according to an embodiment of the present invention.

FIG. 2 shows a flow chart of the method of water quality monitoring according to one embodiment of the present invention. In step S201, a plurality of sensors 101a-101n respectively sense a plurality of environmental parameters at predetermined intervals, and respectively output a plurality of sensing signals that correspond to the foregoing environmental parameters. Wherein the environmental parameters may include temperature, pH value, salinity, oxidation-reduction potential, and the like. In step S202, the data collection module 111 of the embedded system 110 receives the sensing signals from the sensors 101a-101n. In step S203, the data analysis module 112 of the embedded system 110 receives the sensing signals from the data collection module 111 and accesses the normal parameter ranges corresponding to each one of the environmental parameters from the storage module 113, wherein the normal parameter ranges have been stored in advance in the storage module 113. The data analysis module 112 can then determine whether the sensing signals are abnormal according to the normal parameter ranges. When the data analysis module 112 determines that the environmental parameter corresponding to the sensing signal is outside the normal parameter range, this means that the sensor corresponding to the sensing signal is abnormal, the method proceeds to step S204. In step S204, the data analysis module 112 outputs an abnormal signal to the control module 114, causing the control module 114 to output a warning signal to the data analysis server 121 according to the abnormal signal to notify the user through the display module 122 or in another way. Next, in step S205, the control module 114 further transmits the environmental parameter corresponding to the abnormal signal to the data analysis server 121. The data analysis server 121 stores the environmental parameter corresponding to the abnormal signal as abnormal data as a reference for the service life and the calibration of the sensors.

In contrast, when the data analysis module 112 determines that the environmental parameters that correspond to the sensing signals are within the normal parameter ranges, this means that the sensors 101a-101n corresponding to the sensing signals are not abnormal, the method proceeds to step S206. In step S206, the data analysis module 112 outputs a normal signal to the control module 114, the control module 114 then controls the actuators 102a-102n according to the normal signal and the environmental parameters. Next, in step S207, the control module 114 further transmits the environmental parameters to the data analysis server 121. The data analysis server 121 stores the environmental parameters as normal data for further analysis to assess the environmental health. Finally, returning to step S201, the sensors 101a-101n continuously receive the sensing signals that correspond to different environmental parameters, and repeat the foregoing steps.

In summary, in accordance with the water quality monitoring system and the method thereof described by the present invention, determining whether the environmental parameters are abnormal in advance before adjusting the actuators corresponding to the environmental parameters can avoid incorrect adjustment affecting environmental health. In addition, by storing abnormal data corresponding to abnormal environmental parameters, it can also achieve the function that reminds the user to change, clean or calibrate the sensors early to avoid the incorrect determination of environmental health.

The foregoing has outlined features of several embodiments so that those skilled in the art may better understand the detailed description that follows. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions and alterations herein without departing from the spirit and scope of the present invention.

What is claimed is:

1. A water quality monitoring system, comprising:
   a plurality of sensors for respectively sensing a plurality of environmental parameters and respectively outputting a plurality of sensing signals that respectively correspond to the plurality of environmental parameters;
   a plurality of actuators configured to change the plurality of environmental parameters; and
   an embedded system connected to the plurality of sensors and the plurality of the actuators, the embedded system comprising:
   a storage module configured to store a plurality of normal parameter ranges that correspond to the plurality of respective environmental parameters;
   a data collection module connected to the plurality of sensors and configured to receive the plurality of sensing signals;
   a data analysis module connected to the storage module and the data collection module, wherein the data analysis module is configured to determine that the plurality of sensors corresponding to the plurality of sensing signals are abnormal in response to the environmental parameters being outside the normal parameter ranges, determine that the plurality of sensors corresponding to the sensing signals are normal in response to the environmental parameters being within the normal parameter ranges, and output a determination result accordingly; and
   a control module connected to the data analysis module and configured to control the plurality of actuators in response to the determination result indicating that the plurality of sensors are normal, and to output a warning signal in response to the determination result indicating that the plurality of sensors are abnormal;

wherein the plurality of environmental parameters comprise temperature, pH value, oxidation-reduction potential, and/or salinity.

2. The water quality monitoring system of claim 1, further comprising a back-end system, which comprises:
a data analysis server connected to the control module, wherein the data analysis server is configured to receive the plurality of sensing signals and the warning signal, and the data analysis server stores the plurality of environmental parameters that correspond to the plurality of sensing signals as normal data in response to the determination result indicating that the plurality of sensors are normal and the data analysis server stores the plurality of environmental parameters that correspond to the plurality of sensing signals as abnormal data in response to the determination result indicating that the plurality of sensors are abnormal; and
a display module configured to display the normal data, the abnormal data, and the warning signal.

3. The water quality monitoring system of claim 2, wherein the data analysis server further analyzes an environmental health level according to the normal data and outputs a reminder signal according to the abnormal data.

4. The water quality monitoring system of claim 1, wherein the plurality of actuators comprise a water wheel, a heating rod, and/or a water change valve.

5. The water quality monitoring system of claim 4, wherein the control module further controls the heating rod according to the temperature, controls the water change valve according to the pH value and/or the salinity, and/or controls the water wheel and/or the water change valve according to the oxidation-reduction potential.

6. The water quality monitoring system of claim 1, which is configured to be applied to aquaculture monitoring.

7. A method of water quality monitoring, comprising steps of:
sensing a plurality of environmental parameters through a plurality of sensors, and outputting a plurality of sensing signals that respectively correspond to the plurality of environmental parameters;
receiving the plurality of sensing signals through a data collection module of an embedded system;
through a data analysis module of the embedded system, determining that the plurality of sensors corresponding to the plurality of sensing signals are abnormal in response to the environmental parameters being outside a plurality of normal parameter ranges, determining that the plurality of sensors corresponding to the sensing signals are normal in response to the environmental parameters being within the normal parameter ranges and outputting a determination result accordingly, wherein the plurality of normal parameter ranges are stored in a storage module of the embedded system; and through a control module of the embedded system, controlling at least one of a plurality of actuators in response to the determination result indicating that the plurality of sensors are normal, and outputting a warning signal in response to the determination result indicating that the plurality of sensors are abnormal;

wherein the plurality of environmental parameters comprises temperature, pH value, oxidation-reduction potential, and/or salinity.

8. The method of water quality monitoring of claim 7, further comprising steps of:
receiving the plurality of sensing signals and the warning signal through a data analysis server of a back-end system;
storing the plurality of environmental parameters that correspond to the plurality of sensing signals as normal data or abnormal data according to the determination result through the data analysis server; and
displaying the normal data, the abnormal data, and the warning signal through a display module.

9. The method of water quality monitoring of claim 8, wherein the data analysis server further analyzes an environmental health level according to the normal data and outputs a reminder signal according to the abnormal data.

10. The method of water quality monitoring of claim 7, wherein the plurality of actuators comprises a water wheel, a heating rod, and/or a water change valve.

11. The method of water quality monitoring of claim 10, further comprising steps of:
controlling the heating rod according to the temperature through the control module;
controlling the water change valve according to the pH value and/or the salinity; and/or
controlling the water wheel and/or water change valve according to the oxidation-reduction potential.

\* \* \* \* \*